(12) United States Patent
Anstett et al.

(10) Patent No.: US 6,197,427 B1
(45) Date of Patent: Mar. 6, 2001

(54) PROCESS FOR THE PRODUCTION OF ZEOLITE MEMBRANES SUPPORTED ON POROUS GLASS AND A ZEOLITE MEMBRANE SO PRODUCED

(75) Inventors: Martine Anstett, Rueil Malmaison; Ronan Le Dred, Riedisher; Jean-Louis Guth, Mulhouse; Alain Methivier; Christian Streicher, both of Rueil Malmaison, all of (FR)

(73) Assignee: Institut Francais du Petrole (FR)

( * ) Notice: Subject to any disclaimer, the term of this patent is extended or adjusted under 35 U.S.C. 154(b) by 0 days.

(21) Appl. No.: 08/761,200

(22) Filed: Dec. 6, 1996

(30) Foreign Application Priority Data

Dec. 8, 1995 (FR) .................................................. 95 14564

(51) Int. Cl.$^7$ ...................................................... B32B 17/00
(52) U.S. Cl. .......................... 428/426; 428/432; 264/45.1; 264/45.5; 210/500.21; 210/490; 210/502.1; 210/506
(58) Field of Search .............................. 210/500.21, 490, 210/502.1, 506; 264/45.1, 45.5; 428/426, 432

(56) References Cited

U.S. PATENT DOCUMENTS

| | | | | |
|---|---|---|---|---|
| 4,699,892 | * | 10/1987 | Suzuki | 502/4 |
| 5,362,522 | * | 11/1994 | Barri | 427/435 |
| 5,474,681 | * | 12/1995 | Fehlner | 210/502.1 |
| 5,567,664 | * | 10/1996 | Barri | 502/4 |
| 5,712,461 | * | 1/1998 | Zhang | 204/157.15 |

* cited by examiner

Primary Examiner—Timothy M. Speer
(74) Attorney, Agent, or Firm—Millen, White, Zelano & Branigan, P.C.

(57) ABSTRACT

A process for the production of a composite membrane constituted by a continuous zeolite layer which is principally located on the surface of a glass support is described. The process comprises, in succession, at least one step in which partial hydrolysis of the silica of the internal and external surfaces of the porous support is carried out, and a zeolite crystallization step.

Figure 1:
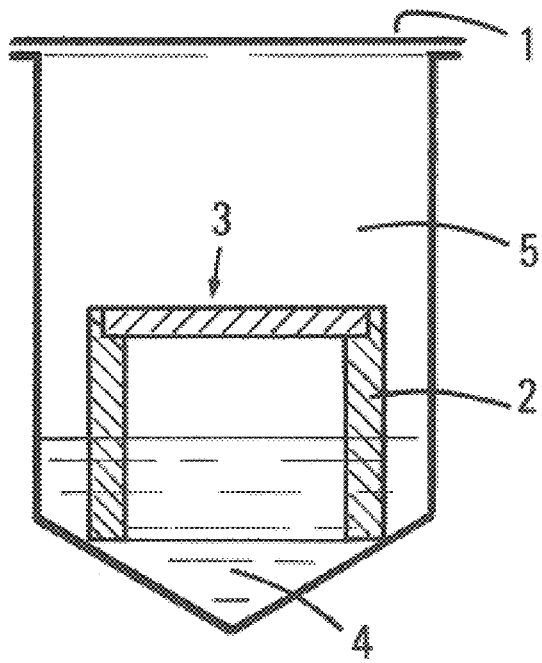

The supported zeolite membranes obtained are advantageously used in continuous separation processes.

38 Claims, 2 Drawing Sheets

PROCESS FOR THE PRODUCTION OF ZEOLITE MEMBRANES SUPPORTED ON POROUS GLASS AND A ZEOLITE MEMBRANE SO PRODUCED

BACKGROUND OF THE INVENTION

The invention concerns a process for the production of zeolite membranes which are supported on porous glass, and membranes so produced.

Zeolites are used for their properties of separation by selective adsorption or for their catalytic properties. However, separation using powdered zeolite is a batch process. A zeolite membrane offers the possibility of using a continuous process of economical interest for separating molecules.

A variety of zeolite membrane production processes have already been described. Such membranes are frequently prepared by crystallising a film of zeolite on and/or in a porous support or on a non porous support. There are two possible cases.

In the first case, the support is immersed in a zeolite precursor gel and the ensemble is subjected to hydrothermal conditions to crystallise the zeolite. Japanese patent application JP-A-60/129119, for example, describes a membrane composed of a film of zeolite crystallised on the surface of an alumina support. In U.S. Pat. No. 5,100,596, therefor a membrane is produced by crystallising a molecular sieve on a non porous surface and separating the film from that surface. In European patent EP-A-0 481 660, which concerns a supported zeolite membrane, the zeolite layer is directly bonded to the support. Before crystallising the zeolite, the support is brought into contact with a solution or suspension containing a source of silicic acid to form silicic acid oligomers on the surface. Japanese patent application JP-A-06/321530 describes a process for the production of composite membranes in which the synthesis temperature is increased during crystallisation.

In the second case, the support is brought into contact with a colloidal solution, separated therefrom and placed in saturated steam to crystallise the zeolite from the adsorbed solution. International patent application WO-A-93/17781 describes a process for forming a zeolite membrane by exposing an aqueous or alcoholic colloidal solution deposited on a porous support to saturated steam.

Adhesion of the zeolite to the support must be good in a composite membrane. As a result, the zeolite film must be bonded directly to the support. Treatment of the support surface to increase its reactivity is sometimes necessary. The reactivity can be increased, for example, by forming silicic acid oligomers on the support surface using external reactants. As a result, bonding of these oligomers to the support is decidedly weak and their distribution is not homogeneous.

SUMMARY OF THE INVENTION

The present invention concerns a process for preparing zeolite membranes supported on porous glass. The process comprises a partial hydrolysis step for the silica of the internal and external surfaces of the support before the zeolite crystallisation step. The invention also concerns membranes obtained by this process.

The membranes obtained have certain qualities and can advantageously be used in continuous separation processes. Partial hydrolysis of the silica of the internal and external surfaces of the support apparently produces silanol groups or a silica gel, both of which are more reactive than the initial silica. It may also be that extraction of boron from the glass support leads to a surface which is more accessible to the silicon. Adhesion of the zeolite to the support is thus further improved. Further, the silanol groups or the silica gel formed are chemically bonded to the support surface. As a result, the zeolite crystallised therefrom is directly bonded to the support. This means that the thickness of the zeolite layer is constant and it can be thin.

The zeolite layer is principally located on the external surface of the support. The latter effectively includes pores with a diameter which is too small to contain zeolite crystals.

Figure 5:
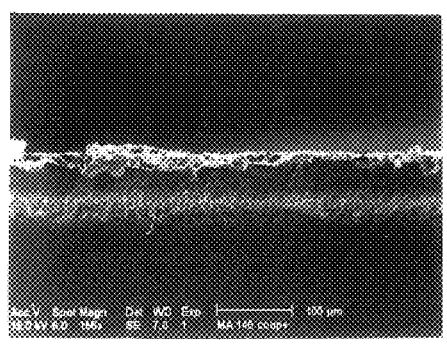
Figure 6:
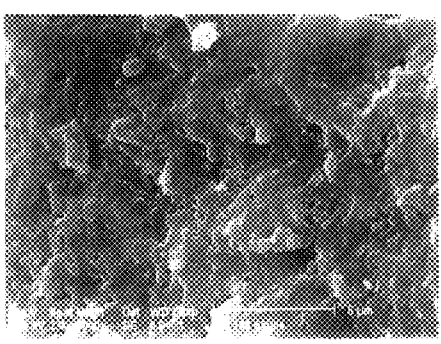

The invention will now be described in more detail with reference to FIGS. 1 to 6, in which:

FIG. 1 is a schematic representation of an experimental apparatus for hydrolysis of the support surface, and FIGS. 2 to 6 are microphotographs showing the original surface of the glass (FIG. 2), the surface of a zeolite membrane under two different magnifications (FIGS. 3 and 4) and sections of the same zeolite membrane under two different magnifications (FIGS. 5 and 6).

The present invention provides a process for the preparation of a composite membrane comprising a continuous zeolite layer which is principally located on the surface of a porous glass support, the process comprising, in succession, at least one step in which partial hydrolysis of the silica of the internal and external surfaces of the porous support is carried out, and a zeolite crystallisation step.

More particularly, the invention provides a process for the production of a composite membrane constituted by a continuous zeolite layer which is principally located on the surface of a glass support having pores with a diameter which is in the range 1 nm to 100 nm and in which the total pore volume fraction is more than 5%, characterized in that it comprises, in succession:

a step (a) in which partial hydrolysis of the silica of the internal and external surfaces of said porous support is carried out;

a step (b) in which the hydrolysed support is dried at a temperature which is below 120° C. then brought into contact with a solution, a sol or a gel containing sources of one or more framework elements and other additives for zeolite crystallisation;

a step (c) in which the zeolite is crystallised by heating said support to a temperature which is in the range 50° C. to 300° C. for a period which is in the range 1 hour to 15 days, to produce a membrane;

a step (d) in which the membrane which is formed is cooled and washed to eliminate, at least partially, said sources of one or more framework elements and/or said zeolite crystallisation additives said washed membrane then being dried;

a step (e) in which the membrane obtained is calcined at a temperature of 300° C. to 800° C., said calcined membrane then being cooled to ambient temperature.

More particularly, in the process of the invention, the support is constituted by porous glass in which the pores have a diameter which is in the range 1 nm to 100 nm, preferably in the range 2 nm to 10 nm, and in which the total pore volume fraction is more than 5%, preferably 25%. A suitable example is the porous glass support sold by Corning under the trade name Vycor 7930®, which has pores with an average diameter of 4 nm.

Any geometry is suitable for the support. It may be planar: disk, sheet, etc.. It may also be tubular or in the form of a spiral.

Partial hydrolysis of the silica in the support is carried out by bringing the support into contact with saturated steam. The support is placed in a suitable apparatus at a temperature which is in the range 100° C. to 500° C., preferably in the range 100° C. to 250° C., and for a period which is preferably in the range 1 hour to 8 days, more preferably in the range 1 hour to 24 hours, to form a silica gel on the internal and external surfaces. An example of a suitable apparatus is shown in FIG. 1. It comprises an autoclave which is lined with polytetrafluoroethylene (1) and a cylindrical element, also of polytetrafluoroethylene, which can keep support (3) in the steam (5) in equilibrium with liquid water (4). Volatile additives can be added to the steam to accelerate the hydrolysis process, for example acids or bases such as hydrochloric acid or ammonia. The apparatus, containing the support is cooled to ambient temperature; the support is dried at a temperature below 120° C. for a period which is in the range 1 hour to 24 hours, preferably at 60° C. for 2 hours, and is then cooled to ambient temperature.

Hydrolysis can also be carried out by bringing the support into contact with pure water or an aqueous acidic or basic solution containing, for example, hydrochloric acid or ammonia or an amine such as propylamine or triethylamine. The support is then immersed in the solution at a temperature which is in the range 20° C. to 250° C. for a period which is in the range 1 hour to 8 days. After cooling if required, the support is removed from the aqueous solution, dried at a temperature of less than 120° C. for a period which is in the range 1 hour to 24 hours and cooled to ambient temperature.

Hydrothermal crystallisation of the zeolite layer can be carried out using two methods.

In the first method, the zeolite is crystallised by heating the hydrolysed support immersed in a solution, a sol or a gel contained in an autoclave lined with polytetrafluoroethylene at a temperature which is in the range 50° C. to 300° C., preferably in the range 100° C. to 130° C., and for a period which is in the range 1 hour to 15 days, preferably in the range 3 hours to 3 days. The solution, sol or gel contains sources of one or more framework elements of the zeolite and other additives for zeolite crystallisation. The framework element sources are capable of producing $TO_4$ tetrahedra (where T is at least one element selected from Si, Al, B, Ga, Ge and P) and are preferably alkoxides, for example for silicon, tetraethoxysilane. However, oxides and nitrates are also suitable.

The zeolite crystallisation additives are constituted by inorganic and/or organic acids and bases and/or salts and/or undissociated molecules which essentially act as mobilising and structuring agents and as a counter-ion for the charge on the framework. Fluoride or hydroxide ions are the principal mobilising agent, which are introduced, for example, in the form of sodium hydroxide and hydrofluoric acid. The various inorganic or organic structuring agents can contain: hydrated cations (sodium or potassium ions), ion pairs (ammonium or phosphonium ions and corresponding anions) or neutral molecules (amines, alcohols or ethers). The crystallisation additives are usually tetrapropylammonium hydroxide or bromide, sodium or potassium hydroxide, ammonia, hydrofluoric acid, and crown ethers.

In the second method, the hydrolysed support is impregnated with the solution, sol or gel containing the sources of one or more framework elements and other crystallisation additives as above. Impregnation preferably consists of immersing the support in the liquid (solution, sol or gel), but other methods can be used, for example deposition of liquid on the surface of the porous support. Impregnation can be carried out at a temperature which is in the range 20° C. to 200° C., for a period which is in the range 1 minute to 72 hours and at a pressure which is in the range $10^{-5}$ and 1 atmospheric pressure. As an example, impregnation can be carried out at ambient temperature for 2 hours at atmospheric pressure. The support is then separated from the solution, sol or gel, then brought into contact with saturated steam at a temperature which is in the range 50° C. and 300° C., preferably in the range 100° C. and 130° C. and for a period which is in the range 1 hour to 15 days, preferably in the range 3 hours to 5 days, in order to crystallise the zeolite.

The second method including the use of a solution is preferable to the first. Hydrothermal synthesis by exposure to saturated steam can limit the volume of reaction medium and as a result, attack on the support in the case of an aggressive reaction medium, for example a basic medium. In the case of an MFI zeolite type precursor solution, the basic medium which is rich in structuring agent allows the formation of small spherical crystals which assemble together in a far more uniform fashion. Further, zeolite crystal growth takes place exclusively on the external surface of the support. The pores are effectively too small to contain zeolite crystals. The reactants introduced into the pore volume of the support participate in supplying the crystalline growth of the zeolite.

The membrane formed by one or other of the two methods is cooled to ambient temperature, separated from the reaction medium if necessary and washed to eliminate, at least partially, excess sources of the framework elements and/or the zeolite crystallisation additives. Washing is preferably carried out with distilled water. The membrane is then dried, preferably at 60° C., for a period which is in the range 2 hours to 24 hours, and cooled to ambient temperature.

Hydrothermal crystallisation of the zeolite layer followed by cooling, separation from the reaction medium if necessary, then washing and drying of the membrane formed can be repeated as many times as is necessary.

The membrane is then calcined by gradually increasing the temperature to a temperature which is in the range 300° C. to 800° C., preferably in the range 400° C. to 600° C. This increase can be carried out continuously or in stages over a period which is in the range 5 hours to 50 hours. The calcining temperature is then kept at this value for a period which is in the range 10 minutes to 24 hours. The membrane is then slowly cooled to ambient temperature. Cooling can be continuous or in stages over a period which is in the range 1 hour to 24 hours.

The process can be applied to any zeolite, i.e., any crystalline solid characterized by a structure comprising a three-dimensional framework resulting from the interlinking of $TO_4$ tetrahedra (T=Si, Al, B, Ga, Ge and/or P), each oxygen atom being common to two tetrahedra, and containing channels and cavities of molecular dimensions. Structural types designated under the IUPAC nomenclature as FAU, GME, MOR, OFF, NFI, MEL, FER, LTA and CHA are suitable examples.

The process can also be applied to any solid resulting from the interlinking of $SiO_4$ tetrahedra with $TO_6$ octahedra (T=Ti, Mn, Mo and/or W), for example titanosilicates, and to mesoporous MCM-41 type solids.

The membranes obtained by the process of the invention can advantageously be used in processes for separation of gases or in processes for separation of liquids, for example pervaporation. Among these separations, can be cited:

the separation of n- and iso-isomers of $C_4$–$C_8$ hydrocarbons;

the separation of $C_6$–$C_7$ of paraffinic isomers according to their branching degree (mono-, di- or tribranched isomers);

the separation of p-xylene from mixtures with other xylene(s);

the separation of methane and nitrogen;

or the separation of methane and carbon dioxide.

EXAMPLES

The following examples are intended to illustrate the invention but are not limiting.

Example 1

The glass support used was from Corning (reference: "Vycor" 7930®). It had the following characteristics: chemical composition: 96% $SiO_2$; 3% $B_2O_3$; 0.4% $Al_2O_3$; alkalis (traces) and arsenic (traces); average pore diameter: 4 nm.

Figure 2:
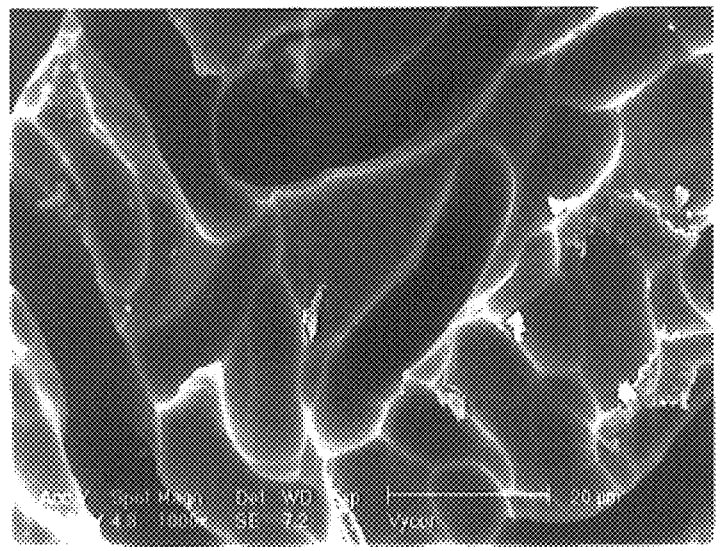
Figure 3:
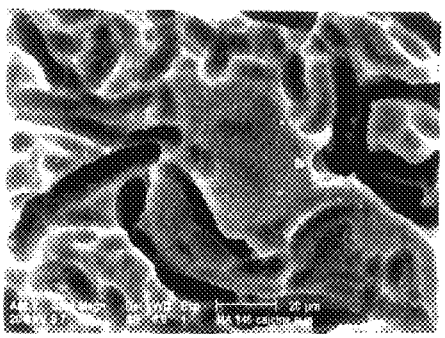
Figure 4:
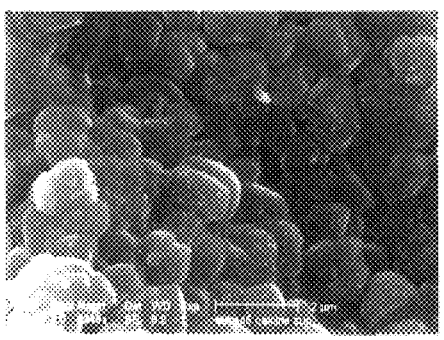

It was placed in an autoclave lined with PTFE (FIG. 1) containing 10 g of distilled water and was kept out of the water by means of a cylindrical PTFE element. The autoclave was heated to 170° C. for 19 hours. Under these conditions, saturated steam increased the chemical reactivity of the support surface. The autoclave containing the support was cooled to ambient temperature. The support was then dried at 60° C. for 2 hours, cooled to ambient temperature in a dessicator packed with silica gel, and weighed. The mass was 1.2305 g. The support was then immersed in a solution with the following molar composition: 1 $SiO_2$; 0.004 $Na_2O$; 0.18 $TPA_2O$; 19.2 $H_2O$; 4 $C_2H_5OH$ for 2 hours. This solution was prepared by addition of an aqueous solution of sodium hydroxide and tetrapropylammonium to tetraethoxysilane. The two-phase mixture was stirred at ambient temperature for 20 hours to hydrolyse the alkoxide. The support was removed from the solution. Under these conditions, the mass of the support was increased by 0.33 g. The support containing the solution was placed in saturated steam at 100° C. for 96 hours. The autoclave containing the support was cooled to ambient temperature. The support was washed with distilled water, dried at 60° C. for 2 hours and cooled to ambient temperature in a dessicator packed with silica gel. It was treated a second time with a solution with the same composition as before, for 2 hours. 0.31 g of solution had been incorporated. A second zeolite crystallisation was carried out in saturated steam at 100° C. for 120 hours. The autoclave containing the membrane was cooled to ambient temperature. The membrane was washed with distilled water, dried at 60° C. overnight, cooled to ambient temperature in a dessicator packed with silica gel, calcined at 500° C. for 6 hours then cooled to ambient temperature (heating rate: 0.5° C./min; cooling rate: 1° C./min). The X ray diffractogram indicated complete coverage of the surface of one of the two surfaces by MFI type zeolite. Scanning electron microscope photographs showed the presence of small crystals which were spherical in shape. They formed a compact layer bonded to the support. This layer followed the surface contour and was thus directly bonded to the support (FIG. 2).

Before the calcining step (zeolite channels obstructed by $TPA^+$), the membrane was methane-tight. This showed an absence of spaces between the zeolite crystals.

The membrane obtained was calcined at 500° C. for 6 hours.

Example 1A

The procedure of Example 1 was duplicated and the membrane obtained was also calcined at 500° C. for 6 hours.

Example 2 (comparative)

The operating procedure was similar to that described in Example 1, but the chemical reactivity of the support was not augmented before zeolite crystallisation. No zeolite crystallised on the external surface.

Example 3

The operating procedure was similar to that of Example 1 but hydrolysis was carried out by hydrothermal heating of the support immersed in 20 g of distilled water at 170° C. for 19 hours and the zeolite layer was crystallised in a single step.

Example 4

Example 1 was repeated except that the calcination step was carried out at a temperature of 600° C. for 6 hours.

Example 5

Gas permeation measurements were carried out on the membranes described in Examples 1 and 1A.

Each membrane, calcined at 500° C. for 6 hours, was adhered to a perforated metal disk using gas tight epoxy resin. Each ensemble was placed in a gas permeation apparatus.

The pure gas permeabilities of the membranes and corresponding selectivities are given in Tables 1 and 2 respectively. The permeabilities and selectivities of the membrane are shown for two types of 50/50 mixtures (Table 3).

TABLE 1

| | Pure gas permeabilities at 145° C. | | |
|---|---|---|---|
| | | Permeability | |
| | Pressure difference | ($10^{-8}$ mol/s Pa/m$^2$) | |
| Gas | ($10^5$ Pa) | Ex 1 | Ex 1A |
| $H_2$ | 2.3 | 4.3 | 6.0 |
| He | 2.3 | 2.7 | 3.8 |
| $CH_4$ | 2.3 | 0.7 | 1.0 |
| $CO_2$ | 2.3 | 0.4 | — |

TABLE 2

| Selectivities at 145° C. obtained from pure gas permeabilities at 50, 100 and 145° C. | | | |
|---|---|---|---|
| Gas | | Selectivity | |
| Temperature ° C. | 50 | 100 | 145 |
| $H_2$/He | — | — | 1.6 |
| $H_2$/$CH_4$ | 13 | 11 | 6.0 |
| $H_2$/$CO_2$ | — | — | 10.8 |

TABLE 3

| Permeabilities and selectivities for two 50/50 mixtures at 149° C. with membrane of Example 1 | | | | |
|---|---|---|---|---|
| Type of mixture | $H_2$ and $CO_2$ | | $H_2$ and $CH_4$ | |
| Gas | $H_2$ | $CO_2$ | $H_2$ | $CH_4$ |
| Upstream pressure bar | 1.65 | 1.65 | 1.75 | 1.75 |
| Downstream pressure (bar) | 0.69 | 0.31 | 0.84 | 0.16 |
| Total permeability ($10^{-3}$ mol/s m$^2$) | 4.74 | | 5.18 | |

TABLE 3-continued

Permeabilities and selectivities for two 50/50 mixtures at 149° C. with membrane of Example 1

| Type of mixture | $H_2$ and $CO_2$ | | $H_2$ and $CH_4$ | |
|---|---|---|---|---|
| Gas | $H_2$ | $CO_2$ | $H_2$ | $CH_4$ |
| Specific permeability $10^{-8}$ mol/s m$^2$ Pa) | 3.4 | 1.1 | 4.78 | 0.52 |
| Coefficient of selectivity | | 3.1 | | 9.2 |

Example 6

Gas permeation measurements were carried out on the membrane described in Example 4.

Like in Example 5, the membrane calcined was adhered to a perforated metal disk using gas tight epoxy resin. The ensemble was placed in a gas permeation apparatus.

Results of permeance for n-butane and iso-butane are shown at various temperatures, as well as the selectivity coefficient (Table 4).

TABLE 4

Pure gas permeabilities and selectivities

| Temperature (C°) | Permeances ($10^{-8}$ mol/s Pa · m$^2$) | | Coefficient of selectivity |
|---|---|---|---|
| | n-$C_4H_{10}$ | i-$C_4H_{10}$ | |
| 26 | 0.7 | 0.2 | 3.5 |
| 110 | 1.0 | 0.2 | 5.0 |
| 146 | 1.1 | 0.2 | 5.5 |

The pressure difference was $10^5$ Pa

What is claimed is:

1. A process for the production of a composite membrane comprising a continuous zeolite layer which is principally located on the surface of a glass support, characterized in that it comprises, in succession, at least one step in which partial hydrolysis of the silica of the internal and external surfaces of the porous support, and a zeolite crystallisation step.

2. A process according to claim 1, characterized in that it comprises the following successive steps:
   a step (a) in which partial hydrolysis of the silica of the internal and external surfaces of said porous support is carried out, said support having pores with a diameter which is in the range 1 nm to 100 nm and in which the total pore volume fraction is more than 5%;
   a step (b) in which the hydrolysed support is dried at a temperature which is below 120° C. then brought into contact with a solution, a sol or a gel containing sources of one or more framework elements and other additives for zeolite crystallisation;
   a step (c) in which the zeolite is crystallised by heating said support to a temperature which is in the range 50° C. to 300° C. for a period which is in the range 1 hour to 15 days, to produce a membrane;
   a step (d) in which the membrane which is formed is cooled and washed to eliminate, at least partially, said sources of one or more framework elements and/or said zeolite crystallisation additives said washed membrane then being dried;
   a step (e) in which the membrane obtained is calcined at a temperature of 300° C. to 800° C., said calcined membrane then being cooled to ambient temperature.

3. A process according to claim 2, in which the glass support has pores with a diameter which is in the range 2 nm to 10 nm and has a total pore volume fraction of more than 25%.

4. A process according to claim 2, in which hydrolysis is carried out by bringing said support into contact with saturated steam at a temperature which is in the range 100° C. to 500° C. for a period which is in the range 1 hour to 8 days.

5. A process according to claim 4, in which said saturated steam is supplemented with an acidic or basic additive which is hydrochloric acid or ammonia.

6. A process according to claim 2, in which the hydrolysis of (a) is carried out by bringing said support into contact with pure water at a temperature which is in the range 20° C. to 250° C. for a period which is in the range 1 hour to 8 days.

7. A process according to claim 6, in which said pure water is supplemented with an acidic or basic additive which is hydrochloric acid, ammonia or an amine.

8. A process according to claim 2, in which, in (b), the hydrolysed support is brought into contact with a solution containing sources of one or more framework elements and other zeolite crystallisation additives.

9. A process according to claim 2 in which in (c), the zeolite is crystallised by heating said support immersed in said solution, said sol or said gel for a period which is in the range 3 hours to 3 days.

10. A process according to claim 2, in which, in (e), said support is separated from said solution, said sol or said gel, then brought into contact with saturated steam for a period which is in the range 3 hours to 5 days, before crystallising the zeolite.

11. A process according to claim 2, characterized in that in (c), the temperature is 100° C. to 130° C.

12. A process according to claim 2, in which, in (d), washing is effected using distilled water.

13. A process according to claim 2, in which the operations of (b) (c) an (d) are repeated at least once using said membrane formed after (d).

14. A process according to claim 2, in which, in (e), the membrane is calcined by a gradual increase of temperature to a calcining temperature which is in the range 400° C. to 600° C. for a period which is in the range 5 hours to 50 hours, said membrane being maintained at said cacining temperature for a period which is in the range 10 minutes to 24 hours, said calcined membrane then being gradually cooled to ambient temperature over a period which is in the range 1 hour to 24 hours.

15. A membrane produced by a process comprising successively partially hydrolyzing silica of internal and external surfaces of a porous glass support, and zeolite crystallization.

16. A membrane according to claim 15, in which the zeolite formed results from interlinking of $TO_4$ tetrahedra where T represents at least one element which is Si, Al, B, Ga, Ge or P.

17. A membrane according to claim 15, in which the zeolite formed is of a structural type which is FAU, GME, MOR, OFF, MFI, MEL, FER, LTA or CHA.

18. A process for the separation of gases, comprising contacting said gases with a membrane according to claim 15.

19. A process for the separation of liquids, comprising contacting said liquids with a membrane according to claim 15.

20. A membrane according to claim 15, produced by a process comprising (a) partially hydrolyzing of the silica of the internal and external surfaces of said porous support, said support having pores with a diameter which is in the range 1 nm to 100 nm and in which the total pore volume fraction is more than 5%;

(b) drying the hydrolysed support at a temperature which is below 120° then contacting with a solution, a sol or a gel containing sources of one or more framework elements and other additives for zeolite crystallisation;

(c) crystallizing the zeolite by heating said support to a temperature of about 50° C. to 300° C. for a period which is about 1 hour to 15 days, to produce a membrane;

(d) cooling the membrane which is formed and washing to eliminate, at least partially, said sources of one or more framework elements and/or said zeolite crystallisation additives said washed membrane then being dried;

(e) calcining the membrane obtained at a temperature of about 300° C. to 800° C., said calcined membrane then being cooled to ambient temperature.

21. A membrane according to claim 20, in which the glass support has pores with a diameter which is in the range 2 nm to 10 nm and has a total pore volume fraction of more than 25%.

22. A membrane according to claim 20, in which hydrolysis is carried out by bringing said support into contact with saturated steam at a temperature which is in the range 100° C. to 500° C. for a period which is in the range 1 hour to 8 days.

23. A membrane according to claim 22, in which said saturated steam is supplemented with acidic or basic additives which are hydrochloric acid or ammonia.

24. A membrane according to claim 20, in which the hydrolysis of step (a) is carried out by bringing said support into contact with pure water at a temperature which is in the range 20° C. to 250° C. for a period which is in the range 1 hour to 8 days.

25. A membrane according to claim 24, in which said pure water is supplemented with acidic or basic additives which are hydrochloric acid, ammonia or an amine.

26. A membrane according to claim 20, in which, in (b), the hydrolysed support is brought into contact with a solution containing sources of one or more framework elements and other zeolite crystallisation additives.

27. A membrane according to claim 20 in which, in (c), the zeolite is crystallised by heating said support immersed in said solution, said sol or said gel for a period which is in the range 3 hours to 3 days.

28. A membrane according to claim 20 in which, in (e), said support is separated from said solution, said sol or said gel, then brought into contact with saturated steam for a period which is in the range 3 hours to 5 days, before crystallising the zeolite.

29. A membrane according to claim 20, characterized in that in (c), the temperature is 100° C. to 130° C.

30. A membrane according to claim 20 in which, in (d), washing is effected using distilled water.

31. A membrane according to claim 20, in which the operations of (b) (c) and (d) are repeated at least once using said membrane formed after step (d).

32. A membrane according to claim 20 in which, in (e), the membrane is calcined by a gradual increase of temperature to a calcining temperature which is in the range 400° C. to 600° C. for a period which is in the range 5 hours to 50 hours, said membrane being maintained at said calcining temperature for a period which is in the range 10 minutes to 24 hours, said calcined membrane then being gradually cooled to ambient temperature over a period which is in the range 1 hour to 24 hours.

33. A composite membrane comprising a continuous zeolite layer principally located on the surface of a glass support.

34. A process for the separation of gases, comprising contacting said gases with a membrane according to claim 33.

35. A process for the separation of liquids, comprising contacting said liquids with a membrane according to claim 33.

36. A membrane according to claim 33, in which the glass support has pores with a diameter which is in the range 2 nm to 10 nm and has a total pore volume fraction of more than 24%.

37. A membrane according to claim 33, in which said zeolite comprises interlinked $TO_4$ tetrahedra where T represents at least one element which is Si, Al, B, Ga, Ge or P.

38. A membrane according to claim 33, in which said zeolite is of a structural type which is FAU, GME, MOR, OFF, MFI, MEL, FER, LTA or CHA.

* * * * *